ARRANGEMENT AT PULSE CONTROLLED ELECTRONIC SWITCHES

Filed May 23, 1960 2 Sheets-Sheet 1

INVENTOR
WALTER EMIL WILHELM JACOB
By Hane and Nydick
ATTORNEYS

ARRANGEMENT AT PULSE CONTROLLED ELECTRONIC SWITCHES

Filed May 23, 1960 2 Sheets-Sheet 2

INVENTOR
WALTER EMIL WILHELM JACOB
BY Hane and Nydick
ATTORNEYS 3,231,752
Patented Jan. 25, 1966

3,231,752

ARRANGEMENT AT PULSE CONTROLLED ELECTRONIC SWITCHES

Walter Emil Wilhelm Jacob, Hagersten, Sweden, assignor to Telefonaktiebolaget L M Ericsson, Stockholm, Sweden, a corporation of Sweden Filed May 23, 1960, Ser. No. 31,135
Claims priority, application Sweden, May 28, 1959, 5,055/59
5 Claims. (Cl. 307—88.5)

Figure 1:
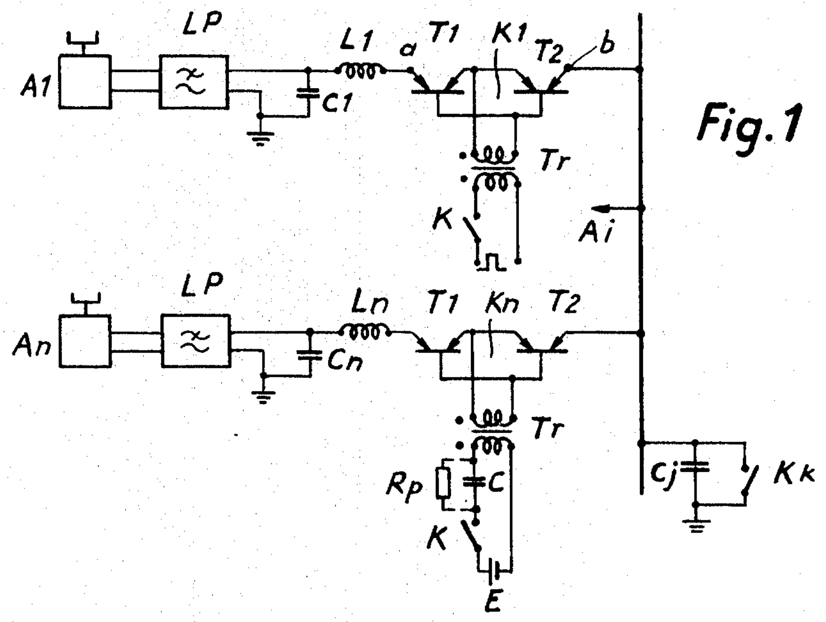

The present invention refers to an arrangement at pulse controlled electronic switches of semi-conductor type, where the control pulses are fed to the switch via a transformer. The arrangement according to the invention is especially suitable at multi-channel transmission systems working in accordance with the time division principle in the cases when the individual channel pulses are fed to the common transmission medium via transistor switches, especially if the transmission of pulse energy occurs in the way described for example in Ericsson Review No. 1, 1956, page 10.

In the said publication an electronic telephone system is described, where the subscribers are connected to a common transmission path via individual switches. The switches belonging to a given connection are closed periodically during the time interval which is allotted to the connection in question so that the communication signals for the different connections are fed over the common transmission path in the form of mutually displaced modulated impulse trains. Between each subscriber and his switch a low pass filter and an inductance is connected, which together with the terminating capacitor of the filter turned towards the contact forms an oscillating circuit with a period equal to double the closing time of the switches. During the time the subscribers' switches are open the capacitors are charged via the low pass filter to a voltage which is proportional to the instantaneous amplitude of the speech voltage. When the switches connecting two subscribers are closed a re-loading course takes place in the oscillating circuit formed by these subscribers' capacitors and inductances, so that after half a period of the resonance frequency the charges of the two subscribers' capacitors have changed places. In this moment the switches shall be opened and the charges shall be levelled in the pulse interval through pertaining low pass filter in the form of a speech current.

In order to obtain a so complete transmission of energy as possible the switches must close and break at the right moment, and this is especially the case when the re-loading current has to pass a number of series connected switches. These demands are, however, not easy to fulfill when the switches consist of semi conductor elements, preferably layer transistors. The transistors have a given inertia at the change from non-conducting to conducting condition because a certain quantity of charge carriers must be supplied before the resistance has decreased to the value of repose in the conducting condition. On the other hand storing of charge carriers causes after-conducting at the change from conducting to non-conducting condition. As this inertia varies considerably between different transistor units it is difficult to get several transistor switches to close at the same time.

In order to decrease after-conducting on account of the storage of charge carriers at the change from the conducting to the non-conducting condition a very large impulse with reverse direction compared with the deblocking pulse has been supplied in order to remove the stored charge carriers. This impulse with reverse direction may be delivered by a current source, which controls the switch, constructed especially for this purpose, but then the current source, however, will be complicated. Another method, which may be applied to transformer driven switches, implies that the magnetic energy stored in the transformer during the opening impulse, is emitted in the form of an impulse having the opposite polarity. Then the pulse source for control purposes must have a high impedance between the pulses, which is achieved by using a switch with a high resistance in the disconnected position. If this switch in its turn is built up of one or several transistors the after-conducting problem has only been moved to another place in the coupling arrangement. To that it has shown that the course of the control current at transformer driven switches will get a less favourable course.

These drawbacks may be avoided in accordance with the invention, which refers to an arrangement of pulse controlled electronic switches of the semi conductor type preferably comprising transistors, where the control pulses are fed to the switch via a transformer, which arrangement is characterized thereby that a capacitor is connected between the primary winding of the transformer and the controlling pulse source, the primary inductance of the transformer, the capacitance of the capacitor and the resistance of the controlling current circuit of the switch, reflected to the primary side of the transformer, are chosen so that the circuit formed by these elements has a zero passage of current flow through the resistance at or about the back flank of the control pulses.

Figure 2:
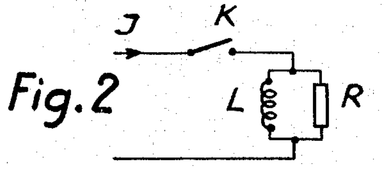
Figure 5:
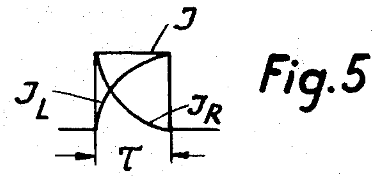
Figure 3:
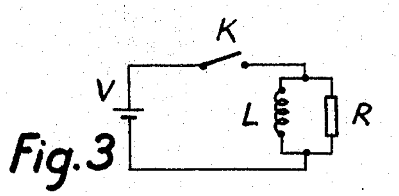
Figure 6:
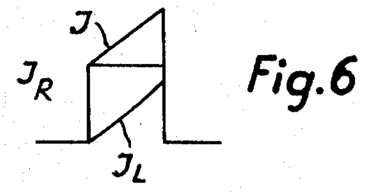
Figure 4:
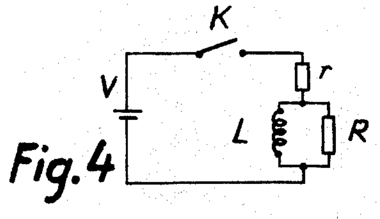
Figure 7:
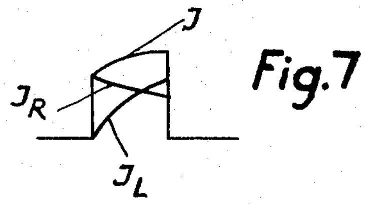
Figure 8:
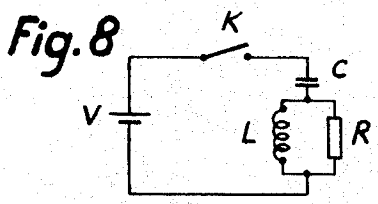
Figure 9:
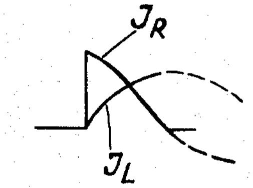
Figure 10:
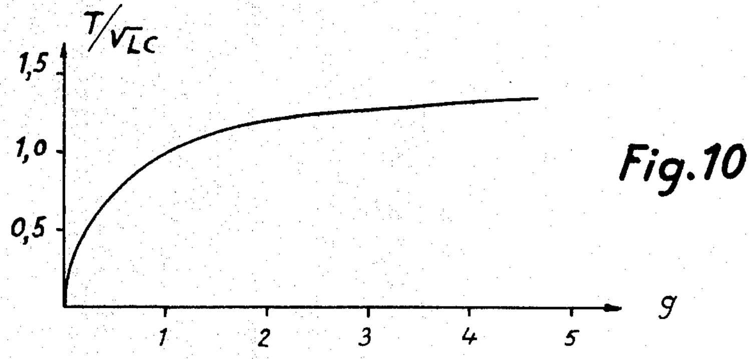
Figure 11:
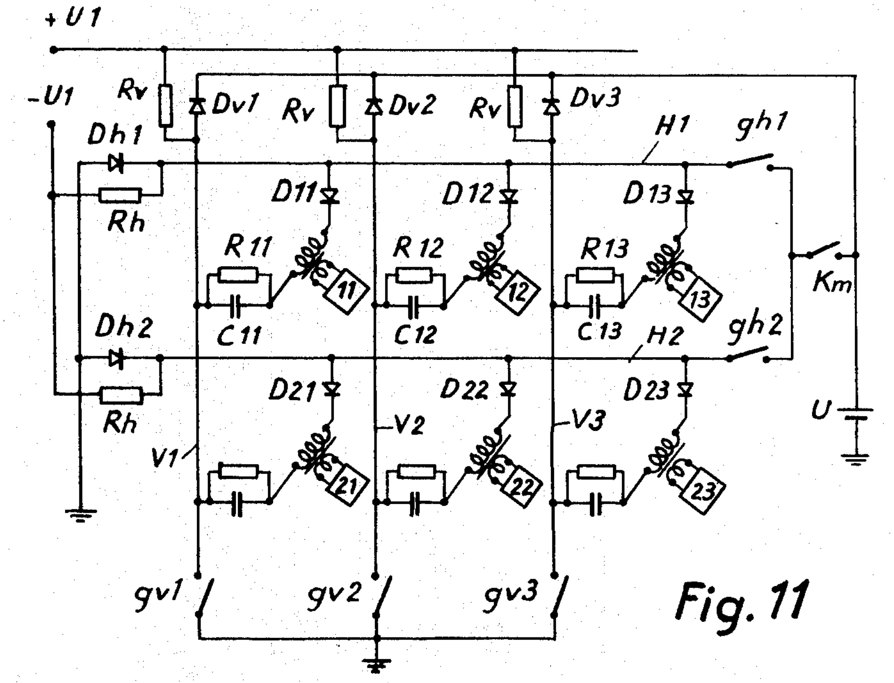

The invention will be more closely described in connection with the attached drawings, where FIG. 1 schematically shows an electronic telephone system according to the time division principle, FIGS. 2, 3, 4 show equivalent circuit diagrams for different forms of the transistor switch according to FIG. 1, FIGS. 5, 6, 7 show waveforms of the control current as a function of time for the cases shown in FIGS. 2, 3 and 4 respectively, FIG. 8 shows the equivalent circuit for an arrangement according to the invention, FIG. 9 shows a waveform diagram of control current as a function of time for the circuit according to FIG. 8, FIG. 10 shows a diagram over the time to the first zero passage of the control voltage as a function of the damping of the control circuit, and FIG. 11 shows a matrix coupling for controlling a transistor switch made in accordance with the invention.

FIG. 1 shows schematically an electronic telephone system working in accordance with the time division principle. A number of subscribers A1–A*n*, of which only two, A1 and A*n*, are shown in the figure, are connected to a common transmission medium T via a low pass filter LP, an inductance L1 . . . L*n* and an electronic switch K1 . . . K*n* consisting of two transistors T1 and T2. The last element of the low pass filter consists of a shunt capacitor C1 . . . C*n*, which together with the respective inductance L1 . . . L*n* forms an oscillating circuit. A connection between two subscribers, for example A1 and A*n*, is obtained thereby that the switches K1 and K*n* are closed periodically during a time interval allotted to the connection, the charges stored in the capacitors C1 and C*n* changing places with each other provided that the connecting time of the switches K1 and K*n* is $\tau$ and the resonant oscillation period of the resonant circuit formed by the capacitors C1, C*n* and the inductance L1, L*n* is exactly twice the time $\tau$. If the time $\tau$ diverges from this value a complete change of energy between the capacitors C1 of the two subscribers is not obtained. The time is made as short as possible so that the time between the impulses may be used for so many other coincident connections (channels) as possible.

The capacitor $Cj$ shown in FIG. 1 represents the total stray capacitances of the system, which have been increased so that $$Cj=\frac{2C}{3} \text{ or } \frac{2C}{15}$$

where $C=C1=Cn$

This value of $Cj$ gives in series with the mutually parallel connected transmission circuits L1, C1, L$n$, C$n$ of the two connected subscribers a new oscillating circuit with a resonant frequency, which with $$Cj=\frac{2C}{3}$$

is twice as great and with $$Cj=\frac{2C}{15}$$

is four times greater than the resonant frequency of the very transmission circuit L1, C1, L$n$, C$n$ between the two subscribers. This means that the voltage flow on the common transmission medium always is one or several complete periods during the contact closing time or pulse time $\tau$, that is the charge of $Cj$, which at the beginning of a transmission pulse is zero, is mainly zero also at the end of the pulse. Therefore the damping on account of the influence from the stray capacitance will be negligible. Small remaining charges, which arise on account of circuit damping in the remaining part of the system, are removed during the interval between two channel pulses through the periodically working shortcircuiting contact K$k$.

Depending on the charge distribution between the capacitors C1 and C$n$ of the two subscribers joining in a connection, the shape of the current through the switch may vary between half a sine wave and a whole sine wave and all possible shapes which may be received by combining half a sine wave and a whole sine wave. Common to all these wave shapes is that the changing of charges has happened just at the moment when the current has a zero passage and changes polarity. Therefore the switch shall break at this moment. At a too early breaking of one of the switches the charge will not be transmitted completely, and a too late breaking causes a part of the transmitted charge to pass back to the stray capacitance $Cj$. In both of these cases damping will arise. Also at the closing of the switches it is necessary to obtain an exact coincidence between the switches included in a connection, so that the oscillating flow will start at the same time along the whole transmission way. These demands are not easy to fulfill with contacts consisting of semi conductor elements, preferably layer transsistors, because of the inertia of the charge carriers mentioned previously.

The electronic switches shown in FIG. 1 and consisting of transistors T1 and T2 have proved to be suitable for pulse systems of this kind. The two transistors, which preferably but not necessarily are of symmetrical type, have the emitter-collector circuits connected in series between the points $a$ and $b$ in the transmission circuit. In the current direction $a$–$b$ the right transistor is blocking, in the direction $b$–$a$ the left transistor is blocking. The control circuit is connected between the parallel connected emitters and the parallel connected bases. If the control circuit is fed with a current impulse via the transformer T$r$ the two transistors will be saturated and the resistance between $a$ and $b$ will decrease to about 1 ohm.

As mentioned previously it has been tried to use the magnetic energy stored in the transformer T$r$ during the control pulse to generate an impulse with reverse polarity over the secondary winding of the transformer when the control pulse ceases, whereby stored charge carriers are rapidly drawn out. This, however, makes great demands upon the current source, which emits the control pulses. In order to illustrate the invention more precisely several different modifications for feeding the control circuit of the switches will first be described.

The current switch K1 shown in FIG. 1 may alternatively be controlled by pulses with constant current amplitude, pulses with constant voltage amplitude or with pulses which are something between constant current and constant voltage.

FIG. 2 shows an equivalent circuit diagram for a current switch, which is controlled by pulses with constant current amplitude I. The constant control current I is fed via the contact K and branches out between the resistance R, which is the equivalent resistance of the control circuit reflected to the primary side, and the inductance L, which is the primary inductance of the transformer. The contact K is normally open and is closed only during the pulse time in order to allow the constant current I to pass. The current distribution between the resistance $R(I_R)$ and the inductance $L(I_L)$ during the pulse time appears from FIG. 5. The two currents vary according to an exponential-function with the time constant $L/R$ but in different directions so that the sum of the currents is contant. The current $I_R$ constitutes the current which controls the current switch, while $I_L$ constitutes the magnetizing current of the transformer. The value of the magnetizing current at the end of the impulse represents the magnetic energy stored in the transformer, which energy at the end of the impulse is used for generating the back impulse mentioned above for rapidly drawing the charge carriers out of the transistors T1 and T2 of the current switch.

This arrangement has the drawback that the current through the resistance R, that is the control current, decreases very rapidly so that the current is not sufficient for controlling the switch completely at the end of the pulse time, especially if the pulse, which passes the above-mentioned switch, consists of a whole sine wave with a current maximum also during the second half of the pulse time. The rapid decrease of the control current $I_R$ may certainly be compensated for by increasing the time constant $L/R$ but then also the current $I_R$ will be considerably greater than zero at the same time as the magnetizing current will be correspondingly smaller. The greater control current at the end of the pulse causes a greater storing of charge carriers at the same time as the magnetic energy $\frac{1}{2}LI^2$ available for drawing out the charge carriers decreases. The after-conducting will therefore be considerable and the required precision at the breaking of the switch cannot be attained.

Similar drawbacks are present with feeding with constant voltage E according to the equivalent circuit diagram in FIG. 3 and the waveform diagram in FIG. 6. The current $I_R$ is constant $V/R$ during the pulse time, while the current $I_L$ increases according to the function $$I_L=\int_0^\tau Vdt$$

and reaches the value $V\tau/_L$ at the end of the pulse. With constant V and $\tau$ the magnetic energy thus increases inversely proportional to L.

When the control current $I_R$ is constant during the whole impulse time the storing of carriers will be considerable. By dimensioning the inductance L in a suitable way it is certainly possible to store energy enough during the pulse time for drawing out the charge carriers rapidly at the end of the impulse but, on account of the great spread between different transistors with respect to charge storing as well as the input resistance of the control circuit, some problems arise. A transistor switch with low input resistance would, for example, draw a high control current and the charge storing would be considerable, that is the inductance L must be great. A high value on the inductance L means on the other hand that a transistor switch with a high input resistance in the control circuit and therewith low carrier storing has to withstand a high voltage surge when the magnetic energy, which is not consumed for drawing out the charge carriers, shall be dissipated. This voltage surge can be so high that the transistor is ruined. Individual dimensioning of the inductance L is for economical reasons unthinkable and a making the input resistance uniform with a series resistance deteriorates the drawing out of charge carriers too much.

By connecting a series resistance on the primary side of the driving-transformer T*r* a comprise is reached between controlling with constant current impulses and controlling with constant voltage impulses, an equivalent circuit according to FIG. 4 then being obtained. Nor with this arrangement is a suitable form of the current $I_R$ obtained (FIG. 7).

In order to obtain a low concentration of charge carriers at the end of the pulse it is desirable that the control current decreases about linearly and through zero magnitude at the end of the pulse time. The inductive current $I_L$ ought to be so great that the charge carriers are effectively drawn out without injuriously high voltages being introduced at the change of the input resistance of the control circuit.

This is achieved with the current switch arrangement K*n* shown in FIG. 1, the equivalent circuit diagram of which appears from FIG. 8. The capacitor C connected in series with the primary winding of the transformer T*r* forms together with the inductance L of the transformer and the input resistance R of the control circuit a parallel-damped oscillating circuit in accordance with FIG. 8. The voltage across inductance L and therewith the control current $I_R$ through R takes then the form shown in FIG. 9, and L and C respectively are dimensioned so that the first zero passage of the control current remains at or somewhat after the uncoupling of the control pulse generator.

With arrangements according to the invention the waveform of the control current is better than with the earlier described arrangements. It is possible to choose the zero passage of the control current at or even prior to the uncoupling of the pulse generator and that is advantageous for transistor types with great carrier storing.

A further and greater advantage is that an automatic compensation of individual variations in carrier storage between different transistors is obtained because of varying input resistance and in conjunction with that also a temperature compensation. With a small input resistance R, the oscillating circuit is damped more and the time to the first zero passage is less. With a transistor having smaller input resistance R, the increased risk of carrier storing is automatically counteracted with a shortening or a waveform alteration of the control pulse in the right direction. This appears from the curve in FIG. 10, which shows the time T to the first zero passage divided by LC as a function of a quantity $g=R/R_{kr}$, where $R_{kr}$ is the resistance which damps the circuit L, C in FIG. 8 critically (the unperiodical limit case).

The arrangement according to the invention has further advantages when a number ($n$) of transistor switches are arranged in a matrix, the switches being fed with control pulses through two intersecting conductor systems with *a*- and *b*-conductors respectively and with $a \cdot b=n$. In FIG. 11 such an arrangement is shown with six switches 11, 12 . . . 23, two horizontal conductors H1 and H2 and three vertical conductors V1, V2 and V3. Between each horizontal conductor and each vertical conductor a switch is connected which is provided with a control circuit of the same kind as is shown in FIG. 1 in connection with the switch K*n*. The control circuit is completed with a diode D11–D23 connected in series with the primary winding and a resistance R11–R23 in parallel with the capacitor C11–C23. The purpose of this resistance is to discharge the capacitor C11–C23 during the interval between two successive pulses. The purpose of the diodes D11–D23 is to prevent back current paths in the matrix and to serve as a coincidence sensing element at the pointing out of a control circuit of the matrix via the pertaining horizontal and vertical conductor. The diodes are normally held nonconductive with a blocking voltage on the vertical conductors, which is produced with a rest current which comes from a positive voltage source U1 via the resistance R*v* and diodes D*v* to a second voltage source +U. The blocking voltage for the vertical conductors is thus +U. The blocking voltage for the horizontal conductors is produced with a negative rest current, which comes from a negative voltage source −U1 via the resistances R*h* and the diodes D*h* to the negative pole of the other voltage source, that is ground. Thus the horizontal conductors are normally at ground potential. In order to send a control pulse for example to the switch 12 the contact *gv*2 is connected, the rest voltage of the vertical line V2 then being short-circuited and the conductor gets ground potential. The blocking voltage over the diodes D12 and D22 then disappear. If also the contact *gh*1 is connected, no change takes place in the first moment. Not until the main contact K*m*, which is the only time determining organ of the matrix, is connected, does the voltage of the horizontal conductor H1 increases so much that a current impulse of desired kind can flow through the control circuit of the switch 12.

When the main contact K*m* is disconnected again at the end of the pulse time a back impulse starts over the transformer of the control circuit of the switch 12. When using switches, which are controlled in accordance with FIGS. 2 and 3, the back impulse should be limited with the rest voltages of the coordinate conductors. At a voltage exceeding the value U a current should flow from ground through the diode D*h*1, the conductor H1, the diode D12, the control circuit of the switch 12, the conductor V2 and the diode D*v*2 to the voltage source U. When using a control circuit according to the invention a voltage is built up during the pulse time across the capacitor C12, which is about as great as U, which adds to the rest voltages of the horizontal and vertical conductors. Short after the disconnection of the main contact K*m* a back voltage of about double the amplitude is received, whereby also the back impulse may be twice as great before a limiting can take place in the above cited current path. Not until the long interval between two impulses does the voltage over C12 disappear on account of the discharging through the resistance R12.

I claim:

1. A circuit system for pulse controlled electronic switches of the semiconductor transistor type, said circuit system comprising a plurality of pairs of bi-lateral transistors, each pair of transistors being connected between a communication line and a subscriber line, one transistor in each pair blocking current flow in opposite directions between the communication and subscriber lines, a plurality of transformers each having a primary and a secondary winding, each secondary winding being connected to the pair of transistors, each primary winding being connected at one side thereof to a line through a diode and to another line through a capacitor and a resistance connected to the other side thereof, each of the lines being connected to a voltage potential for holding each of the diodes non-conductive, switching means in circuit with the lines, respectively, for connecting voltage potentials to the lines, respectively, to have at least one of the diodes conduct for developing a control pulse in the primary winding thereof for the transistors connected to the secondary winding thereof, the capacitor connected to the primary winding being charged when the diode is conductive for rendering the diode non-conducting, the capacitor discharging through the resistance connected thereto before the switching means is activated again to develop another control pulse, the inductance of each of the primary windings, the capacitor connected thereto, and the equivalent resistance of the circuit connected thereto being selected to have zero current pass through each of the resistances connected to capacitors at about the trailing edge of the control pulse developed in each of the primary windings.

2. A switching circuit for controllably connecting a source of information signals to an information signal utilization means comprising: transistor means, said transistor means including an input terminal, an output terminal, and a control terminal means, said input terminal being adapted to receive information signals from said source of information signals; a transformer, said transformer including a secondary winding connected to the control terminal means of said transistor means, and a primary winding including first and second winding terminals; a capacitor including a first terminal connected to said first winding terminal, and a second terminal; and a control pulse source connected to the second terminal of said capacitor and said second winding terminal; said output terminal of said transistor means transmitting information signals present at the input terminal of said transistor means to said information signal utilization means only as long as said control pulse source transmits a control pulse to said capacitor and said primary winding, the inductance of the primary winding of the transformer, the capacitance of the capacitor connected to said winding and the resistance of the circuit being such that on application of a control pulse to the circuit the resistive component of the current through the circuit passes through zero substantially simultaneously with the trailing edge of the control pulse.

3. The switching circuit of claim 2 wherein said transistor means includes at least one bi-lateral transistor.

4. The switching circuit of claim 2 wherein said transistor means has an input resistance, said input resistance being in parallel with said primary winding, and said capacitor being in series with the parallel combination of said primary winding and said input resistance, the inductance of said primary winding, the capacitance of said capacitor and said input resistance being so chosen to form a damped oscillator circuit between said control pulse source and the control terminal means of said transistor means for controlling the charge carrier storage of said transistor means.

5. The switching circuit of claim 2 further including a discharge resistor connected in parallel with said capacitor, and wherein said control pulse source comprises a diode including an anode and a cathode, means for connecting said cathode to said second winding terminal, a first control conductor connected to said anode, said first control conductor including first and second ends, a first source of potential connected to the first end of said first control conductor, a second source of potential more positive than said first source of potential, first switching means for controllably connecting said second end of said first control conductor to said second source of potential, a second control conductor connected to the second terminal of said capacitor, said second control conductor including first and second ends, a third source of potential more positive than said first source of potential and connected to the first end of said second control conductor, a fourth source of potential less positive than said second source of potential, and second switching means for controllably connecting said second end of said second control conductor to said fourth source of potential so that a control pulse is transmitted to said primary winding only when both said switching means simultaneously connect the second ends of their associated control conductors to their associated sources of potentials.

References Cited by the Examiner

UNITED STATES PATENTS

| | | | |
|---|---|---|---|
| 2,897,378 | 7/1959 | Jones | 307—88.5 |
| 2,915,649 | 12/1959 | Cagle | 307—88.5 |
| 2,952,785 | 9/1960 | Hodder | 307—88.5 |
| 2,963,592 | 12/1960 | De Graaf | 307—88.5 |
| 3,027,465 | 3/1962 | Lorenzo et al. | 307—88.5 |

FOREIGN PATENTS

| | | |
|---|---|---|
| 619,984 | 1/1958 | Canada. |

OTHER REFERENCES

Pulse Generators Radiation Laboratory Series 1948, page 22 cited.

ARTHUR GAUSS, *Primary Examiner.*

HERMAN K. SAALBACH, JOHN W. HUCKERT, *Examiners.*